United States Patent
Feid et al.

(10) Patent No.: US 9,514,372 B2
(45) Date of Patent: Dec. 6, 2016

(54) LANE-TRACKING ASSISTANCE SYSTEM FOR A MOTOR VEHICLE

(71) Applicant: GM GLOBAL TECHNOLOGY OPERATIONS LLC, Detroit, MI (US)

(72) Inventors: Thomas Feid, Mannheim (DE); Ingolf Schneider, Rüsselsheim (DE); Philipp Roeckl, Aschaffenburg (DE); Frank Langkabel, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 408 days.

(21) Appl. No.: 14/133,172

(22) Filed: Dec. 18, 2013

(65) Prior Publication Data
US 2014/0218526 A1 Aug. 7, 2014

(30) Foreign Application Priority Data
Feb. 6, 2013 (DE) .................. 10 2013 002 212

(51) Int. Cl.
*H04N 7/18* (2006.01)
*G06K 9/00* (2006.01)

(52) U.S. Cl.
CPC ................................ *G06K 9/00798* (2013.01)

(58) Field of Classification Search
None
See application file for complete search history.

(56) References Cited

U.S. PATENT DOCUMENTS

| 8,260,536 B2 | 9/2012 | Stefani | |
|---|---|---|---|
| 8,297,815 B2 | 10/2012 | Shimodaira | |
| 2008/0055896 A1* | 3/2008 | Feldmeier | H05B 33/0872 362/231 |
| 2013/0148368 A1* | 6/2013 | Foltin | B60Q 1/08 362/466 |
| 2014/0112532 A1* | 4/2014 | Faber | G06K 9/00791 382/103 |

FOREIGN PATENT DOCUMENTS

| DE | 10 2005 033 842 A1 | 11/2006 | |
|---|---|---|---|
| DE | 10 2007 019 531 A1 | 11/2008 | |
| DE | 10 2008 061 747 A1 | 6/2009 | |
| DE | 10 2008 008 880 A1 | 8/2009 | |
| DE | WO2012130507 A1 * | 4/2012 | ......... G06K 9/00791 |
| DE | 10 2012 002 058 A1 | 1/2013 | |

* cited by examiner

*Primary Examiner* — Sath V Perungavoor
*Assistant Examiner* — Dakshesh Parikh
(74) *Attorney, Agent, or Firm* — John A. Miller; Miller IP Group, PLC

(57) ABSTRACT

The present invention relates to a lane-tracking assistance system for a motor vehicle including a surroundings detection device for determining at least one roadway marking and at least one vehicle headlight which, depending on the detected roadway marking and a position of the motor vehicle that is able to be detected from the roadway marking, is designed to generate light of a differing spectral composition.

18 Claims, 3 Drawing Sheets

LANE-TRACKING ASSISTANCE SYSTEM FOR A MOTOR VEHICLE

TECHNICAL FIELD

The present invention relates to a lane-tracking assistance system for a motor vehicle and a lane-tracking assistant which exhibits a surroundings detection device for detection of at least one road surface marking.

Driver assistance systems such as, for example, tracking or lane change assistance systems are increasingly used in the motor vehicle field. For example, a lane-tracking assistant is known from DE 10 2005 024 382 A1, which exhibits a video camera and appertaining evaluation electronics for detection of the lanes of a road surface.

Using data of the sensor device, a control device determines the lane course, the vehicle orientation in the lane and the transverse position of the vehicle relative to the middle of the actual lane, and, in dependence on these dimensions, computes a force which, via a control element, is applied to the steering of the vehicle to keep the vehicle roughly in the middle of the lane or guide it back to the middle of the lane again. The lane-tracking assistant here actively intervenes in the steering of the vehicle.

Additionally lane-tracking assistance systems are known which generate a warning notice only upon detecting a deviation from the middle of the lane, which signals the driver of the vehicle that he must intervene or that intervention soon will be required. Such warning notices can for example be acoustical, visual and/or haptic, so that for example they are generated by means of a vibrating seat or a vibrating steering wheel.

Such passive lane-tracking assistance systems have thus far been only designed to draw the attention of the driver. If a driver is somewhat distracted and such a warning signal sounds, the driver first must process the warning signal and detect the traffic situation at that moment according to his reaction time, to ultimately be able to adequately react. In especially critical driving situations, occasionally quite a long time may pass until the driver, alerted by the warning signal, reacts adequately.

Therefore it is the goal of the present invention to make available an improved lane-tracking assistance system which is designed to generate intuitively perceptible warning signals, so that driver reaction times by the preferred passive lane-tracking assistance system for mastering a supposedly critical driving situation can be improved. Additionally, the lane-tracking assistance system should be distinguished by as simple, space-saving and cost-effective a design as possible, and be able largely to advantageously rely on vehicle components that are present in any case.

This problem is solved by a lane-tracking assistance system according to patent claim 1, by a motor vehicle according to patent claim 11, with a method according to patent claim 12 and lastly by a computer-program product according to patent claim 14. Advantageous embodiments are the subjects of the dependent patent claims.

Accordingly a lane-tracking assistance system for a motor vehicle is provided which exhibits a surroundings detection device for determining at least one lane marking and at least one vehicle headlight. Depending on the lane marking able to be detected by the surroundings detection device and a position that can be determined from this, especially transverse positioning of the motor vehicle relative to the lane marking, at least one vehicle headlight is designed to generate light with varying spectral composition.

The lane-tracking assistance system accordingly is designed to generate visually perceptible warning signals outside the vehicle passenger compartment. Especially the headlight which is provided anyway on the vehicle is provided as a warning signal, which is coupled into the surroundings detection device or integrated into the lane-tracking assistance system in such a way that it can operate to emit warning signals to be projected onto the roadway that are different at least in spectral terms.

The surroundings detection device typically exhibits a camera or a camera system, especially a front camera, by means of which the driver's visual field or the area of the roadway that is in the direction in which the vehicle is driving, or if necessary an area lying behind the vehicle, can be detected. Additionally, the surroundings detection device exhibits an evaluation unit, by means of which at least one roadway marking, for example a roadway edge marking, but preferably also a center strip of the roadway, can be detected.

The vehicle headlight is especially coupled with the evaluation unit of the surroundings detection device, so that as a consequence of detecting of a deviation lying above a tolerable threshold value, such as a deviation of the vehicle's transverse position from the preset lane middle, a change occurs in the spectral composition of the light emitted or emittable by the vehicle headlight.

If the motor vehicle gets to near a lane marking, then the lane-tracking assistance system can respond to this by a change in the light generated by the vehicle headlights and signal the driver intuitively and purely visually to the deviation from the lane middle.

The spectral composition of the light able to be generated by the vehicle headlight may vary over a comparatively wide spectral range, which extends over more than 50 nm, more than 100 nm, more than 150 nm, more than 200 nm or even more than 250 nm. It is conceivable that the headlight is designed to generate blue light rays in the range of less than 500 nm up to generation of red light rays in the range of up to 650 nm, 700 nm or even 750 nm in wavelength.

Thus for example provision can be made that the vehicle headlight only generates a tinged light beam kept roughly in red or blue when it detects a deviation in excess of what is tolerable or permitted of the vehicle's lateral position from the lane middle, so that the roadway area lying in front of the vehicle is bathed in the corresponding light. Since generally red is frequently used generally as a warning color, through use of a reddish-colored or red light ray, the driver can be intuitively warned when he deviates in impermissible fashion from the lane middle, by means of areas of the roadway that are illuminated red ahead of him.

Instead of, or in addition to, red or yellowish-tinted light beams, it is further conceivable that the spectral composition of the light generated by the vehicle headlights can be shifted into the shorter wavelength, thus to green, blue or even violet.

Regarding shorter-wavelength spectral shares of the visible spectrum, the human eye manifests greater receptivity or sensitivity as compared to longer-wavelength spectral shares. Consequently, such roadway areas illuminated or impinged on with a comparatively shorter-wavelength spectral share can be better detected by the driver.

Especially it is conceivable for the lane-tracking assistance system that the headlight for display of deviations from the lane middle is not merely activated or switched on at times, but rather that the headlight is continuously in operation, but only alters its color spectrum or the spectral composition of the light generated by it as a consequence of a detected deviation of the vehicle position from roughly the lane center, either smoothly or abruptly.

Thus especially a smooth alteration of the spectral composition of the light from the headlight has much less disturbing an effect on opposing traffic or others in traffic than would be the case with a headlight that would blink for a time or with abrupt intensity modulations of the light from the headlight.

The present lane-tracking assistance system is additionally designed for trips in darkness, during which the headlight of a vehicle is in operation anyway. The use of a headlight that is in any case incorporated into the front of the vehicle to generate lane-tracking assistance warning signals proves to be advantageous in regard to the limited design space available in the vehicle, and also in regard to the manufacturing costs. Thus the vehicle headlight can be equipped with a dual function.

According to an advantageous further development, the vehicle headlight is further designed to illuminate the detected roadway marking selectively in differing or in varying spectral colors. The colors can thus represent the degree of deviation from the lane track determined and computed of it by the surroundings detection device.

For example, a green spectral color, roughly in the wavelength range of 550 nm, can signal that the vehicle is correctly keeping to or along the lane middle, while slight, but still tolerable deviations from the lane middle can be signaled by an orange tinting, while lastly greater or impermissible deviations are instantaneously signaled by a predominantly red spectral composition of the light from the headlight.

Because the vehicle headlight is further designed to vary only that solid-angular range in regard to its spectral composition, in which the roadway marking to be heeded is located, the driver of the vehicle obtains not just a qualitative warning, but displays even a quantitative recommendation of in what direction the car is to be steering again toward the lane middle. It is conceivable that the lane-tracking assistance system, upon leaving a detected and/or computed lane middle, illuminates the lateral lane markings that characterize the lane middle in differing spectral colors.

Thus, for example, if the vehicle drifts to the roadway middle, the center line that comes quite near the vehicle is illuminated red, the edge lines in contrast are illuminated in green or as appropriate. If the driver should be somewhat distracted, then the lane-tracking assistance system, supported by generation of at least one additional warning notice, perhaps one perceptible acoustically or haptically, can arouse the attention of the driver and give him an immediate qualitative indication of the detected threat. Intuitive following of the differently illuminated roadway sections can substantially shorten the reaction time of the driver to cope with a possible critical traffic situation.

The vehicle headlight is especially designed to selectively illuminate or shine on the roadway marking detected by the surroundings detection device. Other areas of the roadway that lie outside the roadway marking can be illuminated in a spectral distribution that deviates from this. The at least one vehicle headlight is designed to generate a spatially and spectrally inhomogenous light distribution, as well as one correspondingly able to be altered.

According to another preferred embodiment, the spectral composition of the light emitted by the vehicle headlight is able to be smoothly altered, or in stepwise fashion, in dependence on a distance between the particular vehicle headlight and at least one detected roadway marking. Instead of the distance between the headlight or a side of the vehicle and a roadway marking, the deviation of the vehicle center from a detected or computed lane middle can be used.

The stepwise or continuous alteration of the spectral composition can also continuously guide and lead the vehicle when the lane-tracking assistance system is in long-term operation, and provide support in steering the vehicle. The spectral composition as the deviation from the lane middle becomes greater can be altered in stepwise fashion above a critical limit value of the deviation, while smooth alteration of the spectral composition is preferred where there are only moderate deviations from the lane middle that lie below a preset threshold value.

A multi-stepped and/or smooth alteration of the spectral composition of the light from the headlight can in any case be quantitatively correlated with the degree of deviation from the lane middle, and thus display or signal to the driver of the vehicle the particular prevailing deviation from the lane middle.

According to another preferred embodiment, the spectral composition of the light emitted by the vehicle headlight can be altered due to a pre-set minimum distance between the vehicle or vehicle headlight and at least one detected roadway marking failing to be maintained in the direction of a signal color. Especially the spectral ranges of the visible light spectrum that are easy to perceive in the dark can serve as signal colors. For example, violet or blue tints of the generated light are possible, but also red ones.

If in addition the lane-tracking assistance system is designed so that at least the spectrally alterable share of the light generated by the vehicle headlights is also variable in regard to its direction, the spectrally tinted share of the light of the vehicle headlight can also be deliberately directed to the approximately white roadway marking made to be reflecting, which, corresponding to the spectral composition of the light of the vehicle headlight, is visibly reflected back in the appropriate spectral color for the driver of the vehicle.

According to a further embodiment, the vehicle headlight is additionally configured to illuminate the detected roadway marking with a temporally variable luminous intensity. For example, the vehicle headlight as a whole, or only its spectrally varying share, following a temporal raster, can be switched on and off, thus for example to evoke a blinking or pulsating effect, which further can amplify a visual warning signal.

According to an additional embodiment, the vehicle headlight further is configured to illuminate the detected roadway marking with spatially variable luminous intensity. The vehicle headlight can generate not merely temporally varying, but also spatially modulated luminous intensities, in order especially to more clearly emphasize the position of a roadway marking detected by the surroundings detection device vis-à-vis the surroundings.

Thus for example the solid angle of the headlight in which the roadway marking currently is located, can be impinged on with increased luminous intensity. Along with a purely spectral variation, the luminous intensity and brightness distribution of the headlight can be employed for visualizing tracking assistance warnings.

According to a further embodiment, those roadway limits which are assigned to opposite sides of the vehicle, can be illuminated differently and independently of each other by means of at least one vehicle headlight. Thus, by means of the lane-tracking assistance system, a marking of the lane edge can be illuminated or lighted in totally different fashion from a lane-middle marking. In this way, based on the differing spectral distribution of two headlights differing from each other in the transverse vehicle direction (y), the driver of a motor vehicle can be intuitively signaled as to whether the vehicle is to the right or left of the lane middle of the roadway.

Finally, according to further embodiment, the headlight can also be configured to in essence keep constant the overall intensity or luminosity of the irradiated light with a temporally varying spectral composition of the emitted light. Here especially it is conceivable that the headlight, due to a deviation from the lane middle, exclusively or only varies its spectral composition, with the luminosity or overall intensity remaining essentially the same.

Thus for example a first spectral share of the light emitted by the headlight can be increased at the expense of a second spectral range. An overall intensity or luminosity of the vehicle headlight that stays as constant as possible can generally be advantageous for oncoming traffic or for others in the traffic, since otherwise, flickering luminous intensities of a vehicle headlight would be an irritation.

According to a further embodiment form, the lane-tracking assistance system is configured to determine an ideal line of travel depending on the detected roadway marking, and to visually mark this by means of the at least one vehicle headlight on a travel path lying ahead of the vehicle. The ideal line of travel can be determined on the basis of additional vehicle-specific parameters such as the current speed, the current acceleration or braking delay, the turning of a steering wheel, as well as on the basis of additional parameters of other assistance systems such as for example an ABS or ESP system.

The at least one headlight of the lane-tracking assistance system can serve to project the ideal line of travel, determined using a computer, on the roadway ahead of the vehicle, so that the driver, especially when driving in a sporting manner, can keep the vehicle on the computed ideal path. By this means, driving safety can be increased, especially with a dynamic driving style.

According to a further embodiment, the lane-tracking assistance system further can be coupled with a navigation device of the vehicle. The lane-tracking assistance system, through coupling with a navigation device, can especially display visually the direction of travel or directional changes by means of the at least one vehicle headlight on the roadway lying ahead of the vehicle, to the driver of a vehicle.

The lane-tracking assistance system can also be used as a projection system, by means of which any information needed for navigational purposes can be reproduced through suitably directing the at least one vehicle headlight on the roadway.

Advantageously the at least one vehicle headlight exhibits multiple light sources, such as red, green and blue (RGB) light-emitting diodes (LED), which can for example be arranged in the manner of a two-dimensional grid. The individual light sources can be individually controlled, on the one hand to deliberately alter the spectral composition of the light beam emitted by the vehicle headlight, but also to implement the transverse and spatial intensity distribution, such as for selective illumination and beaming of individual solid-angle areas or roadway areas.

Especially provision is made here that the vehicle headlight is configured to be reflector-free, so that the light emitted from the individual light sources can be directly, and as much as possible without light-absorbing obstacles such as light moderators or color filters, onto the roadway.

Finally, according to a further independent aspect, a vehicle is provided with a lane-tracking assistance system is described previously.

Finally, according to a further aspect a method is provided for operating a lane-tracking assistance system, wherein in a first step, by means of a surroundings detection device, at least one, and preferably multiple roadway markings, in front of, and/or to the side of, the vehicle, are determined. According to this, a relative position of the motor vehicle in relation to roadway markings can be determined using the detected roadway marking. Especially the current track of the vehicle in relation to a lane middle is detected, to detect deviations of the motor vehicle from the lane middle.

In a further step, finally, light is generated with a variable spectral composition, depending on the relative position of the vehicle, by means of the at least one vehicle headlight. The method described herein is especially able to be implemented with the previously described lane-tracking assistance system. All the features and advantages of the lane-tracking assistance system hold true in a corresponding manner for the method provided here; and vice versa.

According to a further embodiment of the method, provision is further made that the light generated or emitted by the vehicle headlights is directed deliberately and continuously at the detected roadway marking. The method can provide a tracking or following of the roadway marking, so that the particular roadway markings detected by the surroundings detection device or by its camera are deliberately followed by the light of the vehicle headlight and deliberately lighted or illuminated.

Finally according to a further aspect, a computer program product is provided for operating a lane-tracking assistance system. Herein the computer program product exhibits software for determining at least one roadway marking by means of a surroundings detection device as well as software for determining a relative position of the motor vehicle in relation to the roadway marking using the detected roadway marking.

In addition, software is provided for generating light with variable or varying spectral composition, wherein the light is spectrally composed in dependence on the relative position of the vehicle by means of at least one vehicle headlight, which is provided on the vehicle in any case.

In a further aspect, lastly, a device is provided for operating a lane-tracking assistance system, wherein the device exhibits means for determining at least one roadway marking by means of a surroundings detection device, additionally means for determining a relative position of the vehicle in relation to the roadway marking using the detected roadway marking, as well as means for generating light with variable spectral composition in dependence on the relative position of the vehicle by means of at least one vehicle headlight.

The device for operation of the lane-tracking assistance system is able especially to be implemented with the lane-tracking assistance system described previously. All of the features and advantages of the lane-tracking assistance system hold true in a corresponding manner for the device for operation of same.

BRIEF DESCRIPTION OF THE FIGURES

Additional purposes, advantages and advantageous options for applications are explained in the following specification of embodiment examples, while referring to the drawings. Shown are.

DETAILED SPECIFICATION

Figure 1:
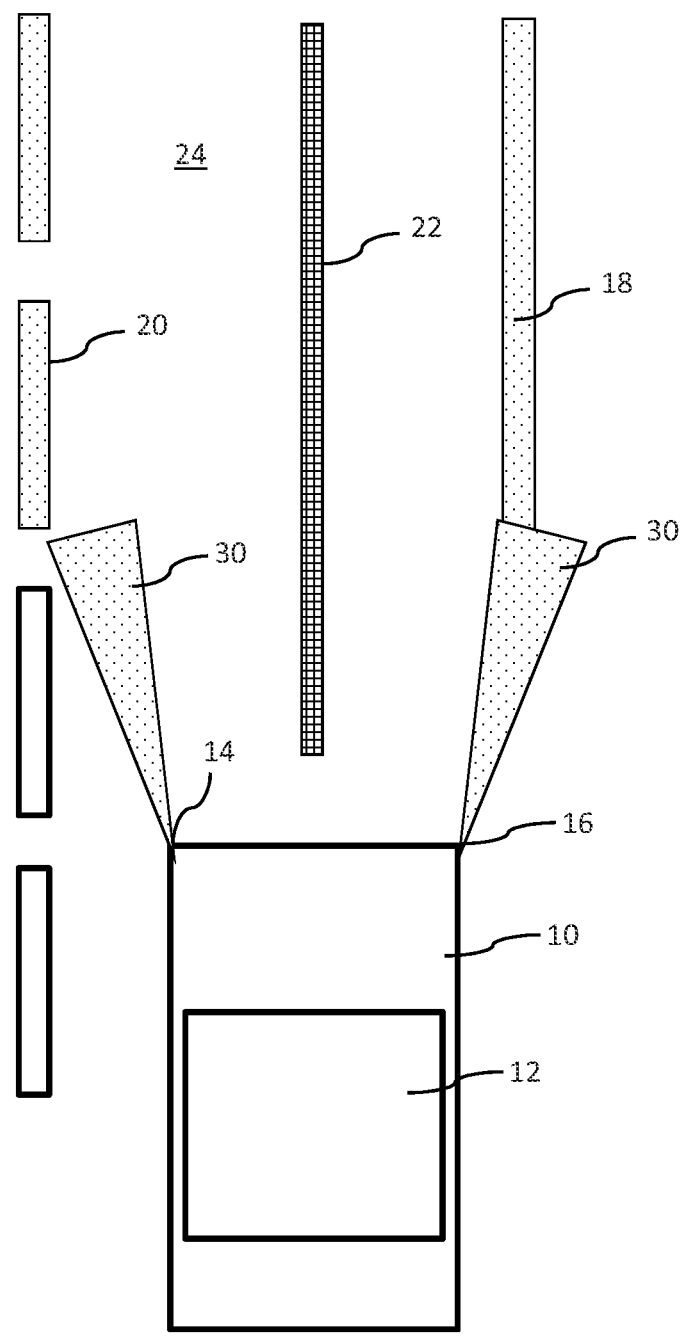
FIG. 1 is a schematic depiction of a motor vehicle following a preset lane middle.

In FIG. 1, a motor vehicle 10 is depicted with a passenger compartment 12, which, exhibits in its front on the left and right at least one headlight 14, 16. As depicted in FIG. 1, the two headlights 14, 16 generate a light beam 30 or light cone with a first spectral composition, for example a white light cone. The vehicle 10 is on a right-side roadway lane and is moving upwards, correspondingly in the forward direction. The roadway 24 can be subdivided into multiple lanes. Presently only one lane is shown, which is limited on the left by a dashed center line 20 and on the right by a roadway edge marking 18.

Figure 3:
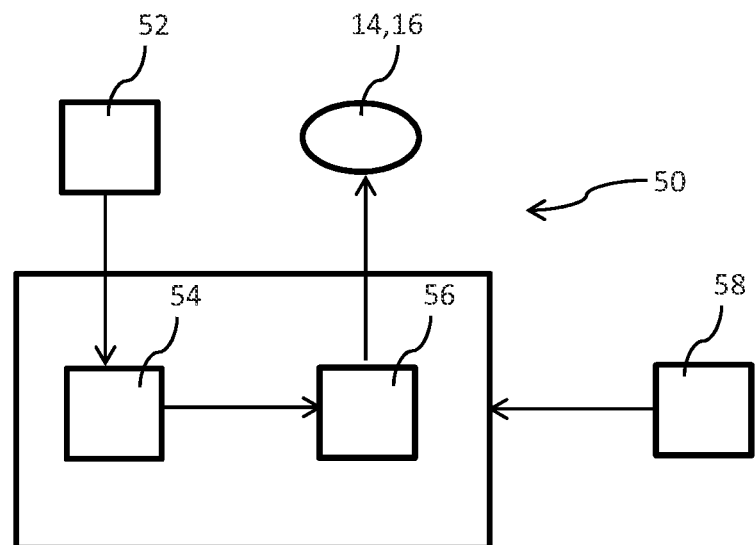
FIG. 3 is a schematic block diagram of the lane-tracking assistance system.

The lane-tracking assistance system 50, which is schematically sketched in FIG. 3, exhibits a surroundings detection device 52, roughly in the form of a front camera or a front camera system. Additionally the lane-tracking assistance system 50 exhibits an evaluation unit 54 coupled with the surroundings detection device 52, by means of which any image data taken by the camera can be evaluated to detect the roadway markings 18, 20 relative to the position and direction of the vehicle 10.

The information able to be generated by the evaluation unit 54 regarding the position, especially the transverse position, the alignment and the speed of the vehicle relative to the roadway markings 18, 20 can further be directed to a control unit 56, by means of which at least one, and preferably both vehicle headlights 14, 16 can be controlled. The evaluation unit 54 and the control unit 56 do not necessarily have to be structurally separate. Rather, control unit 56 and evaluation unit 54 can be integrated into a single and common computer-supported module such as a microcontroller.

In any case the lane-tracking assistance system 50 makes available a control circuit, which, based on visually detected camera data, can issue tracking information, in the form of lane warnings, via headlights 14, 16.

Figure 2:
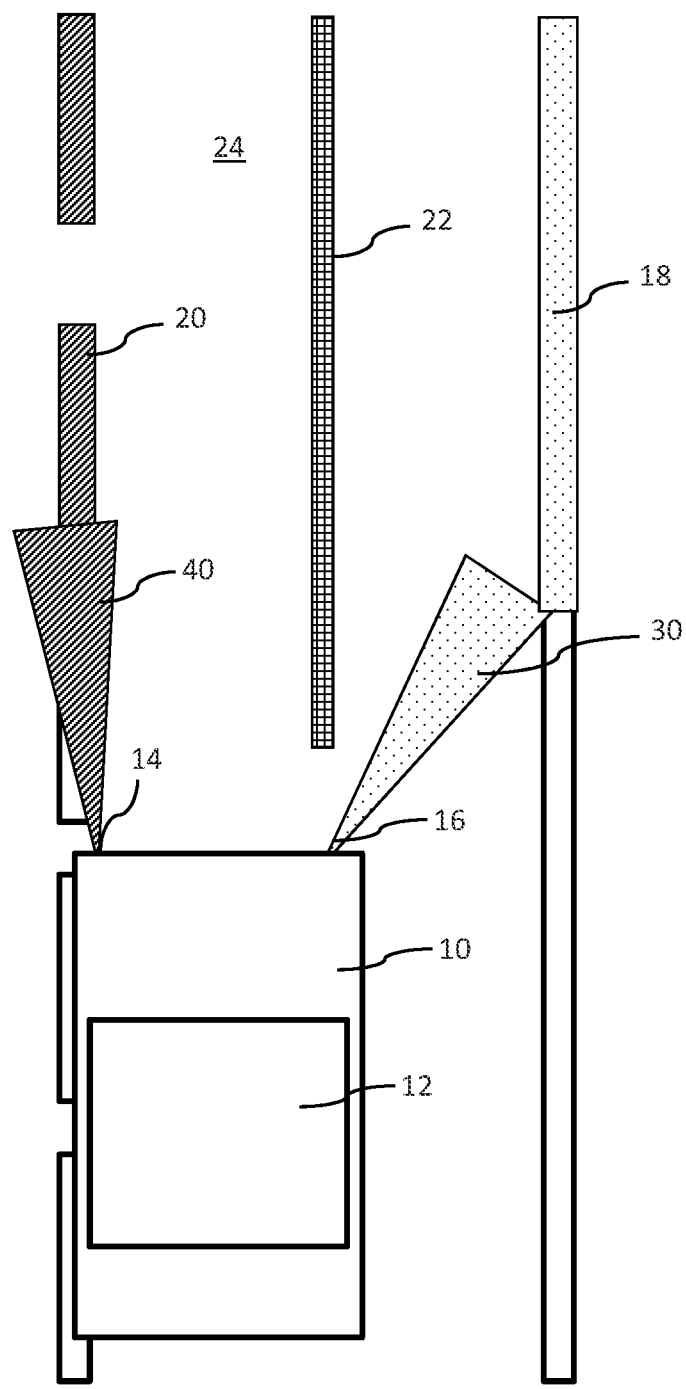
FIG. 2 is a depiction of a vehicle while deviating from the lane middle.

Lastly, in FIG. 2 a situation is depicted in which the vehicle 10 has departed from an ideal line or lane middle 22, and has gotten somewhat too far over toward the roadway center. As shown, the transverse position of the vehicle 10 may fail to hold to a minimum distance to be maintained to the center line 20. The lane-tracking assistance system 50 reacts to every positional change of the vehicle 10 by altering the spectral composition at least of the left headlight 14, which now has failed to keep a permissible minimum distance to the roadway marking 20.

Consequently, the light beam 40 emitted by the left headlight 14 appears in another spectral composition, such as a second one. Corresponding to the distance or corresponding to the degree of deviation from a lane middle 22, the spectral composition of both the left and the right headlight 14, 16 can be altered independent of each other, or synchronous and corresponding with each other.

An asynchronous spectral shift of the light rays 30, 40 of the two front headlights 14, 16 can provide intuitive and direct information regarding the direction and the degree of deviation of the vehicle 10 from the lane middle 22. Thus, for example a lane marking 20 can be illuminated green, and simultaneously the other lane marking 18 can be illuminated or lit red or blue.

Additionally it can be shown from a comparison of FIGS. 1 and 2 that due to the altered transverse position of the vehicle 10, the light beams 30, 40 emitted by the headlights 14, 16 assume a different alignment. Thus, the two separately generated light beams 30, 40 from the two headlights follow the center and edge roadway markings 18, 20.

As FIG. 3 shows, the lane-tracking assistance system 50 additionally can be coupled with a navigation aid 58 of the vehicle 10. In this way the lane-tracking assistance system 50 can also be used to project navigation-related data such as current direction of travel or changes in direction by means of the headlights 12, 14 on the roadway 24.

Figure 4:
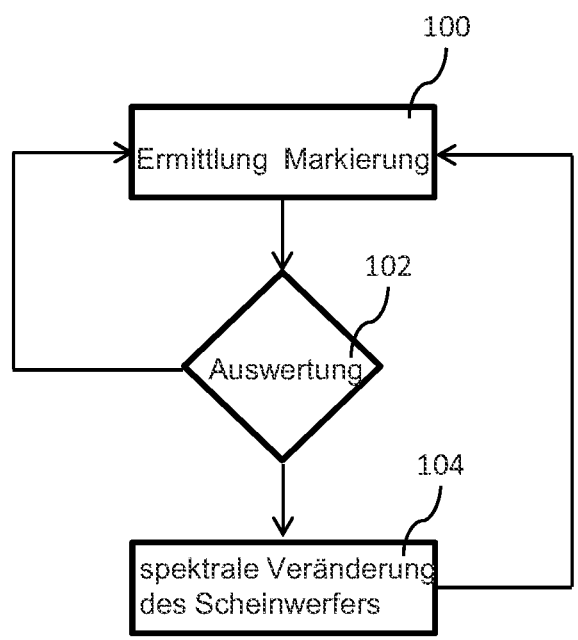
FIG. 4 is a schematic flow chart for implementing the method to operate the lane-tracking assistance system.

Lastly in FIG. 4 a flow chart is sketched of the method for operating the lane-tracking assistance system 50. In a first step 100, by means of the surroundings detection device 52, the roadway marking 18, 20 is determined. Additionally, from this the relative position, especially the transverse position, but if necessary also the alignment of the vehicle 10 in relation to the roadway marking 18, 20 is determined, preferably computed.

In a subsequent step 102 then the relative position of the vehicle is compared with the lane middle or with an ideal line of travel 22. Alternatively, or supplementally, corresponding distances of the vehicle 10 to the preferred lateral roadway markings 18, 20 can be compared with preset tolerance or limit values.

If the vehicle 10 is at a preset lane middle or on an ideal line of travel 22, or within a tolerance range derived therefrom, then step 100 is carried out again. The two steps 100, 102 are ultimately looped until in step 102 a deviation of the vehicle position or direction above a preset limit value vis-à-vis the lane middle or ideal line of travel 22 is detected.

Reacting to this, and in a subsequent step 104, the spectral composition of at least one vehicle headlight 12, 14 is altered. Then the method jumps back again to the first step 100 and the control loops resume.

The embodiment forms depicted only show possible configurations of the invention, to which numerous additional versions are conceivable and within the framework of the invention. The design examples shown in exemplary fashion are not in any way to be construed as limiting the range, applicability or configurational possibilities of the invention. The current specification indicates for one skilled in the art only one possible implementation of an invention-specific embodiment example. A great multiplicity of modifications could be undertaken on the function and arrangement of elements described, without thereby departing from the range of protection defined by the patent claims that follow or their equivalents.

The invention claimed is:

1. A lane-tracking assistance system for a motor vehicle, comprising a surroundings detection device for determining at least one roadway marking and at least one vehicle headlight which, depending on the detected roadway marking and a position of the motor vehicle that is able to be determined from the roadway marking, is designed to generate light of a differing spectral composition, where the at least one vehicle headlight illuminates the roadway marking with light of a first predetermined spectral composition when a lateral distance from the motor vehicle to the roadway marking is less than a first threshold value and illuminates the roadway marking with light of a second predetermined spectral composition when the lateral distance from the motor vehicle to the roadway marking is greater than a second threshold value.

2. The lane-tracking assistance system according to claim 1, wherein the vehicle headlight illuminates the detected roadway marking selectively in differing spectral colors.

3. The lane-tracking assistance system according to claim 1, wherein the spectral composition of the light emitted by the vehicle headlight is able to be altered in a stepped fashion or continuously in dependence on a distance between the particular vehicle headlight and at least one of the detected roadway markings.

4. The lane-tracking assistance system according to claim 3, wherein the spectral composition of the light emitted by the vehicle headlight can be altered as a result of a preset minimum distance between the vehicle or vehicle headlight and at least one detected roadway marking in the direction of a signal color failing to be adhered to.

5. The lane-tracking assistance system according to claim 1, wherein the vehicle headlight illuminates the detected roadway marking with temporally variable luminous intensity.

6. The lane-tracking assistance system according to claim 1, wherein the vehicle headlight illuminates the detected roadway marking with spatially variable luminous intensity.

7. The lane-tracking assistance system according to claim 1, wherein roadway edges assigned to opposite sides of the motor vehicle are able to be illuminated differently and independent of each other by means of at least one vehicle headlight.

8. The lane-tracking assistance system according to claim 1, wherein the headlight is designed essentially to keep the overall intensity or luminosity of the emitted light constant as the spectral composition of the emitted light varies over time.

9. The lane-tracking assistance system according to claim 1, which, depending on the detected roadway marking, determines an ideal line of travel and to visually marks this by means of the at least one vehicle headlight on a roadway lying ahead of the vehicle.

10. The lane-tracking assistance system according to claim 1, which additionally is able to be coupled with a navigation aid and is designed to visually display the direction of travel or changes in a direction of the motor vehicle by means of the at least one vehicle headlight on the roadway lying ahead of the vehicle.

11. A method for operating a lane-tracking assistance system on a motor vehicle, said method comprising:
    determining at least one roadway marking by means of a surroundings detection device;
    establishing a relative position of the motor vehicle in relation to the roadway marking using the detected roadway marking; and
    generating light with variable spectral composition depending on the relative position of the vehicle by means of at least one vehicle headlight, where the at least one vehicle headlight illuminates the roadway marking with light of a first predetermined spectral composition when a lateral distance from the motor vehicle to the roadway marking is less than a first threshold value and illuminates the roadway marking with light of a second predetermined spectral composition when the lateral distance from the motor vehicle to the roadway marking is greater than a second threshold value.

12. The method according to claim 11, wherein the light generated by the vehicle headlight is directed deliberately and continuously onto the detected roadway marking.

13. A software system stored on a non-transitory computer readable medium for operating a lane-tracking assistance system on a motor vehicle, said software system comprising:
    software for determination of at least one roadway marking by means of a surroundings detection device;
    software for determining a relative position of the vehicle in relation to the roadway marking using the detected roadway marking; and
    software for generating light with a variable spectral composition depending on the relative position of the motor vehicle by means of at least one vehicle headlight, where the at least one vehicle headlight illuminates the roadway marking with light of a first predetermined spectral composition when a lateral distance from the motor vehicle to the roadway marking is less than a first threshold value and illuminates the roadway marking with light of a second predetermined spectral composition when the lateral distance from the motor vehicle to the roadway marking is greater than a second threshold value.

14. The method according to claim 11, wherein the spectral composition of the light emitted by the vehicle headlight is able to be altered in a stepped fashion or continuously in dependence on a distance between the particular vehicle headlight and at least one of the detected roadway markings.

15. The method according to claim 14, wherein the spectral composition of the light emitted by the vehicle headlight can be altered as a result of a preset minimum distance between the vehicle or vehicle headlight and at least one detected roadway marking in the direction of a signal color failing to be adhered to.

16. The method according to claim 11, wherein the vehicle headlight illuminates the detected roadway marking with temporally variable luminous intensity.

17. The method according to claim 11, wherein the vehicle headlight illuminates the detected roadway marking with spatially variable luminous intensity.

18. The method according to claim 11, wherein roadway edges assigned to opposite sides of the motor vehicle are able to be illuminated differently and independent of each other by means of at least one vehicle headlight.

* * * * *